(12) United States Patent
Shrivastava (10) Patent No.: US 12,096,247 B2
(45) Date of Patent: Sep. 17, 2024

(54) METHODS AND SYSTEMS FOR DYNAMIC ADJUSTMENT OF BLUETOOTH LOW ENERGY BROADCASTING AND SCANNING

(71) Applicant: Harman International Industries, Incorporated, Stamford, CT (US)

(72) Inventor: Nitish Shrivastava, Cupertino, CA (US)

(73) Assignee: HARMAN INTERNATIONAL INDUSTRIES, INCORPORATED, Stamford, CT (US)

(*) Notice: Subject to any disclaimer, the term of this patent is extended or adjusted under 35 U.S.C. 154(b) by 367 days.

(21) Appl. No.: 17/644,030

(22) Filed: Dec. 13, 2021

(65) Prior Publication Data

US 2022/0240107 A1    Jul. 28, 2022

Related U.S. Application Data

(60) Provisional application No. 63/130,216, filed on Dec. 23, 2020.

(51) Int. Cl.
| | |
|---|---|
| *H04W 4/00* | (2018.01) |
| *H04W 4/80* | (2018.01) |
| *H04W 24/02* | (2009.01) |
| *H04W 48/10* | (2009.01) |
| *H04W 48/16* | (2009.01) |

(52) U.S. Cl.
CPC ............ *H04W 24/02* (2013.01); *H04W 4/80* (2018.02); *H04W 48/10* (2013.01); *H04W 48/16* (2013.01)

(58) Field of Classification Search
CPC ..... H04W 24/02; H04W 48/10; H04W 48/16; H04W 4/80

USPC .......................................................... 370/329
See application file for complete search history.

(56) References Cited

U.S. PATENT DOCUMENTS

| | | | | |
|---|---|---|---|---|
| 11,522,919 B2* | 12/2022 | Yoon | ...................... | A61B 5/686 |
| 11,855,686 B2* | 12/2023 | Yoon | ...................... | H04W 52/02 |
| 11,887,416 B2* | 1/2024 | Hoyer | ...................... | G07C 9/22 |
| 2016/0364819 A1* | 12/2016 | Salimi | ................... | H04W 4/021 |
| 2018/0137317 A1* | 5/2018 | Lee | .................... | G06K 7/10722 |
| 2018/0330293 A1* | 11/2018 | Kulkarni | ............ | G06K 7/10366 |
| 2019/0253243 A1* | 8/2019 | Zimmerman | ........... | H04W 4/80 |
| 2020/0106877 A1* | 4/2020 | Ledvina | .................... | H04L 9/30 |
| 2020/0252436 A1* | 8/2020 | Yoon | ................. | H04W 52/0229 |
| 2020/0364525 A1* | 11/2020 | Mats | .................. | G06K 19/0717 |
| 2021/0264254 A1* | 8/2021 | Yoo | ........................ | G06N 3/045 |
| 2022/0141620 A1* | 5/2022 | Sullivan | ................. | H04W 8/08 |
| | | | | 455/456.1 |

\* cited by examiner

*Primary Examiner* — Marceau Milord
(74) *Attorney, Agent, or Firm* — McCoy Russell LLP (57) ABSTRACT

The methods and systems for contact tracing disclosed herein may dynamically adjust wireless communication algorithms (such as for Bluetooth® interfaces and/or Bluetooth Low Energy (BLE) interfaces) to improve battery life, accuracy, and performance for wireless communication based contact-tracing. In some embodiments, a first wireless-communication library may be established for use in performing wireless-communication broadcasting operations and/or a second wireless-communication library may be established for use in performing wireless-communication scanning operations. The selection of the libraries may be based upon a machine-learning model for determining rates of successful wireless-communication-based data exchange.

19 Claims, 7 Drawing Sheets

METHODS AND SYSTEMS FOR DYNAMIC ADJUSTMENT OF BLUETOOTH LOW ENERGY BROADCASTING AND SCANNING

CROSS REFERENCE TO RELATED APPLICATIONS

The present application claims priority to U.S. Provisional Application No. 63/130,216, entitled "METHODS AND SYSTEMS FOR DYNAMIC ADJUSTMENT OF BLUETOOTH LOW ENERGY BROADCASTING AND SCANNING", and filed on Dec. 23, 2020. The entire contents of the above-listed application are hereby incorporated by reference for all purposes.

FIELD

The disclosure relates to improvements in contact-tracing methods and systems.

BACKGROUND

As the COVID-19 pandemic evolves, although businesses and other organizations are still impacted, they are shifting focus to transitioning back to their offices. Organizations across the world are turning to contact-tracing technology for vigilant and effective tools to track the incidence of COVID-19 positive cases present on their premises, and to track movement and proximity of users (e.g., employees). Contact-tracing methods and systems may enhance or enable secured contact tracing by tracking user movement on an organization's premises by capturing events in which users may come in contact with each other, or in close proximity to each other. Such methods and systems may be employed by organizations planning to re-open their premises for standard operation as safely as possible.

Some contact-tracing methods and systems may make use of various Bluetooth® based devices and associated applications and/or software. For example, methods and systems used by some organizations may employ smart-phone devices, smart-watch devices, and/or Bluetooth® Low Energy (BLE) beacon devices to track and record user movement on the organization's premises, user-contact and/or user-proximity events, violations of safe-distancing parameters, and so on. Corresponding mobile applications may be supported on devices such as Android® and iOS® devices (e.g., for smart phones and/or tablets), and corresponding watch applications may be supported on devices such as Samsung® smart-watch devices. BLE Beacon devices may work with Radius Network devices (e.g., RadBeacon devices).

In addition, some such methods and systems may use web-based console software to provide information regarding COVID-19 positive cases, to perform risk analysis, and to spread an analysis across an organization, facilities, and/or users. Console software may also provide granular information regarding users entering facilities, COVID-19 positive cases, probable cases based on interactions between COVID-19 positive users and other users, user-contact or user-proximity events, violations of safe-distancing parameters, and so on. Console software may also offer customizable rules and/or configurations at different levels (e.g., organization, facilities, and/or users). Options and information displayed may be customized based on the role of the user (e.g., administrator or employee).

SUMMARY

The inventor herein has recognized potential issues with contact-tracing methods and systems making use of Bluetooth® devices. While building BLE based applications, devices may be expected to work in both the foreground and the background (e.g., for user devices), and may employ various different modes (e.g., iBeacon, central, and/or peripheral).

Applications may therefore be disposed to deciding a sequence of BLE scanning methods and/or BLE broadcast methods, and using them in different modes of the device (e.g., while in the foreground or the background). However, these may take the form of static rules, and might not consider various environment factors (e.g., the types of devices, modes, activities on the device, and so forth). This may reduce the performance of BLE scanning operations, such as by leading devices to do continuous scans, thus consuming more battery capacity. This may also reduce the accuracy of scanning operations and broadcasting operations.

Put in other terms, participating devices may make use of any of a variety of Bluetooth® libraries to implement Bluetooth® based advertising operations (e.g., to allow other devices to detect the close proximity of the participating device). Similarly, participating devices may make use of any of a variety of Bluetooth® libraries to implement Bluetooth® based scanning operations (e.g., to detect other devices in close proximity to the participating device). However, the selection of Bluetooth® libraries may leave a participating device susceptible to undesirably high power usage (and therefore, likely, high battery usage), and/or susceptible to undesirably high rates of missing user-contact events (and/or user-proximity events).

Disclosed herein are mechanisms that use environment data (such as BLE packets) and context (such as whether an application is in the foreground or the background, or whether there are scheduled notifications or tasks) to automatically set priorities and/or orders for BLE-packet broadcast operations and scanning operations. The proposed methods and systems may take into consideration device modes, activities, and communication environments (e.g., nearby devices) to decide upon algorithms or libraries for BLE broadcasting and/or BLE scanning. In various embodiments, this may occur at a Bluetooth® communication layer, when a participating device shares information and/or otherwise interacts with other participating devices over BLE links. Historical data may thereby be used to dynamically change modes and to adapt to the environment, which may improve performance, accuracy, and battery consumption.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
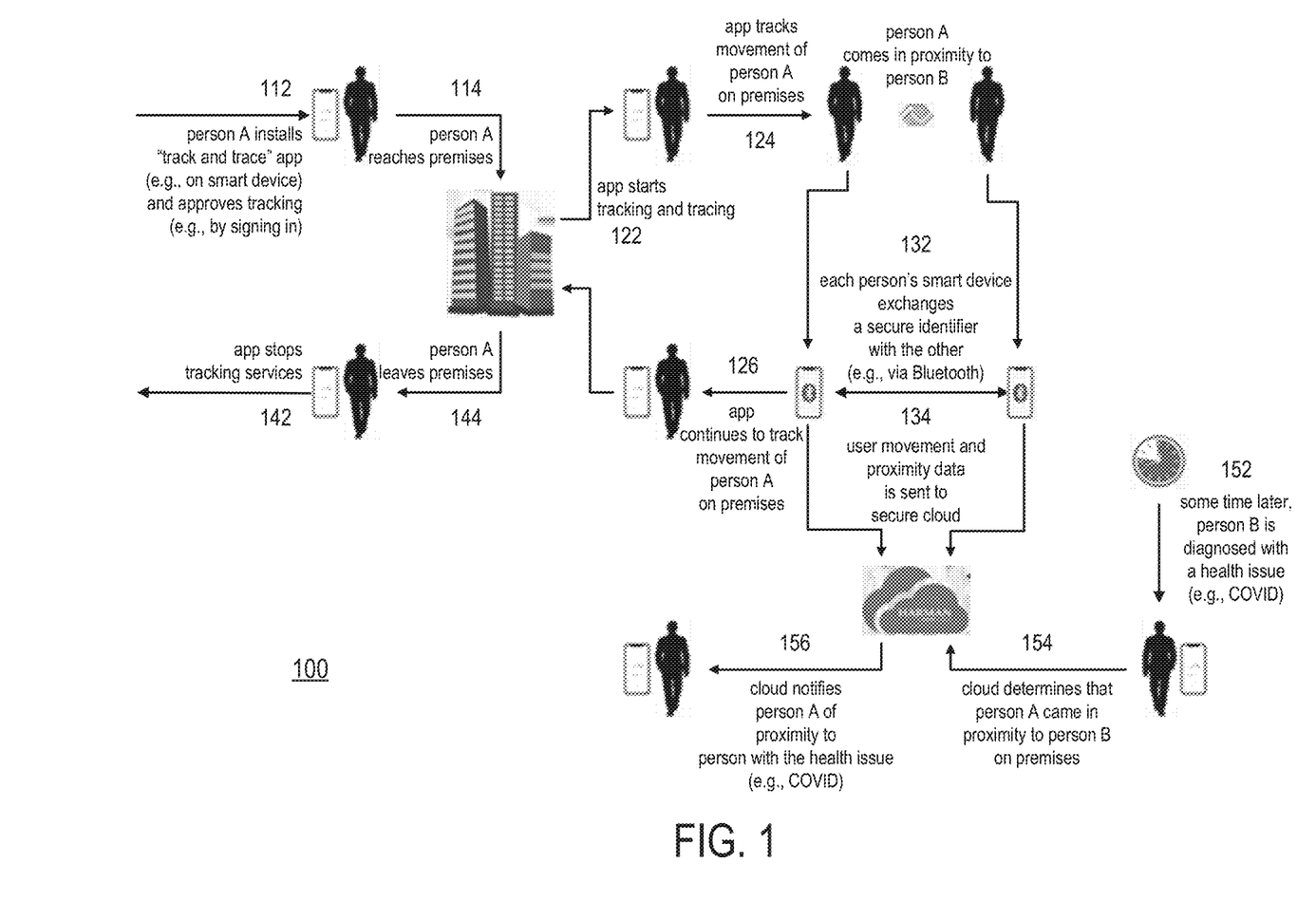
FIG. 1 shows a scenario of Bluetooth® based contact-tracing methods and systems, in accordance with one or more embodiments of the present disclosure.
Figure 2:
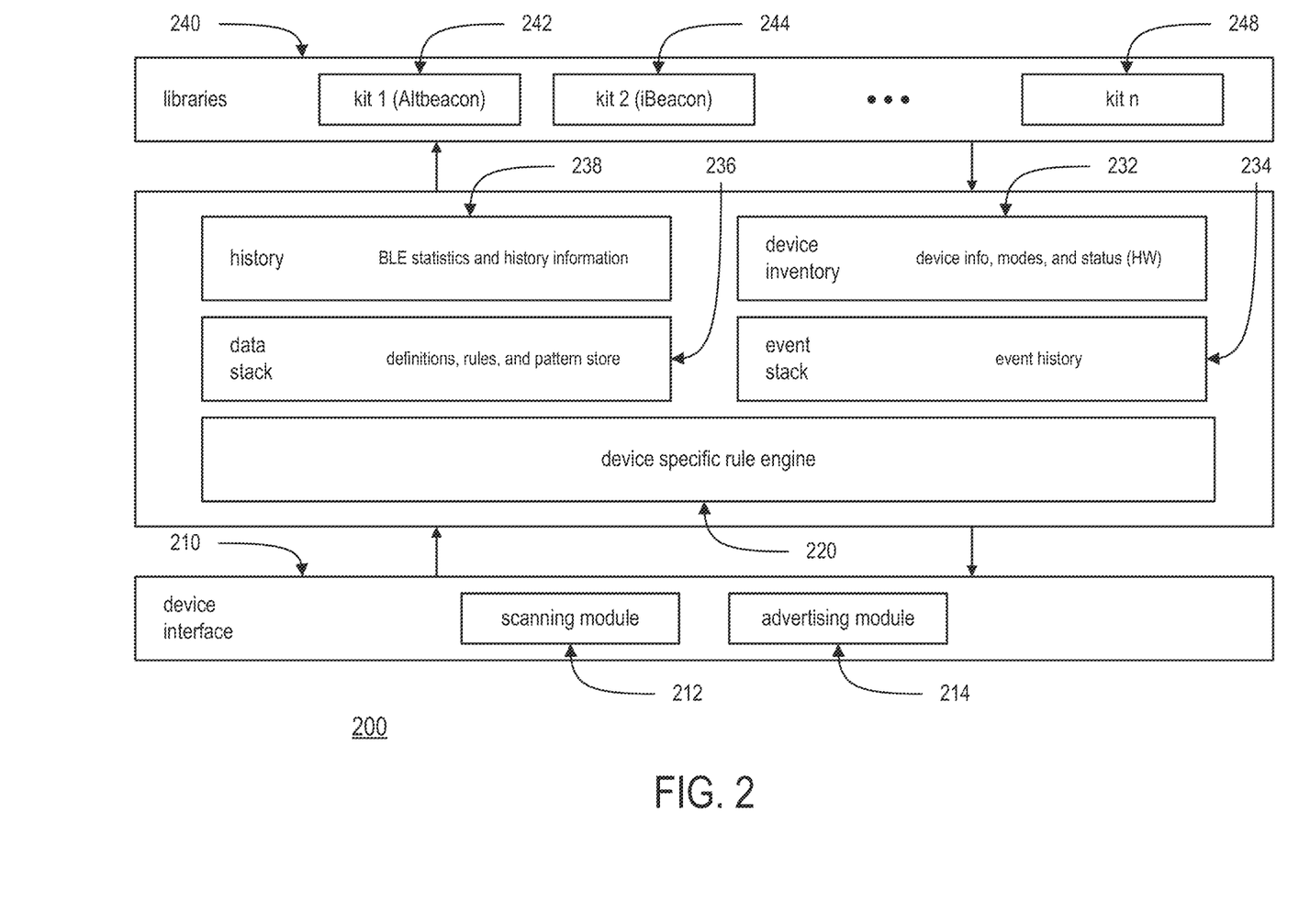
FIG. 2 shows a block diagram of an architecture for a device participating in a scenario of Bluetooth® based contact-tracing, in accordance with one or more embodiments of the present disclosure.
Figure 3:
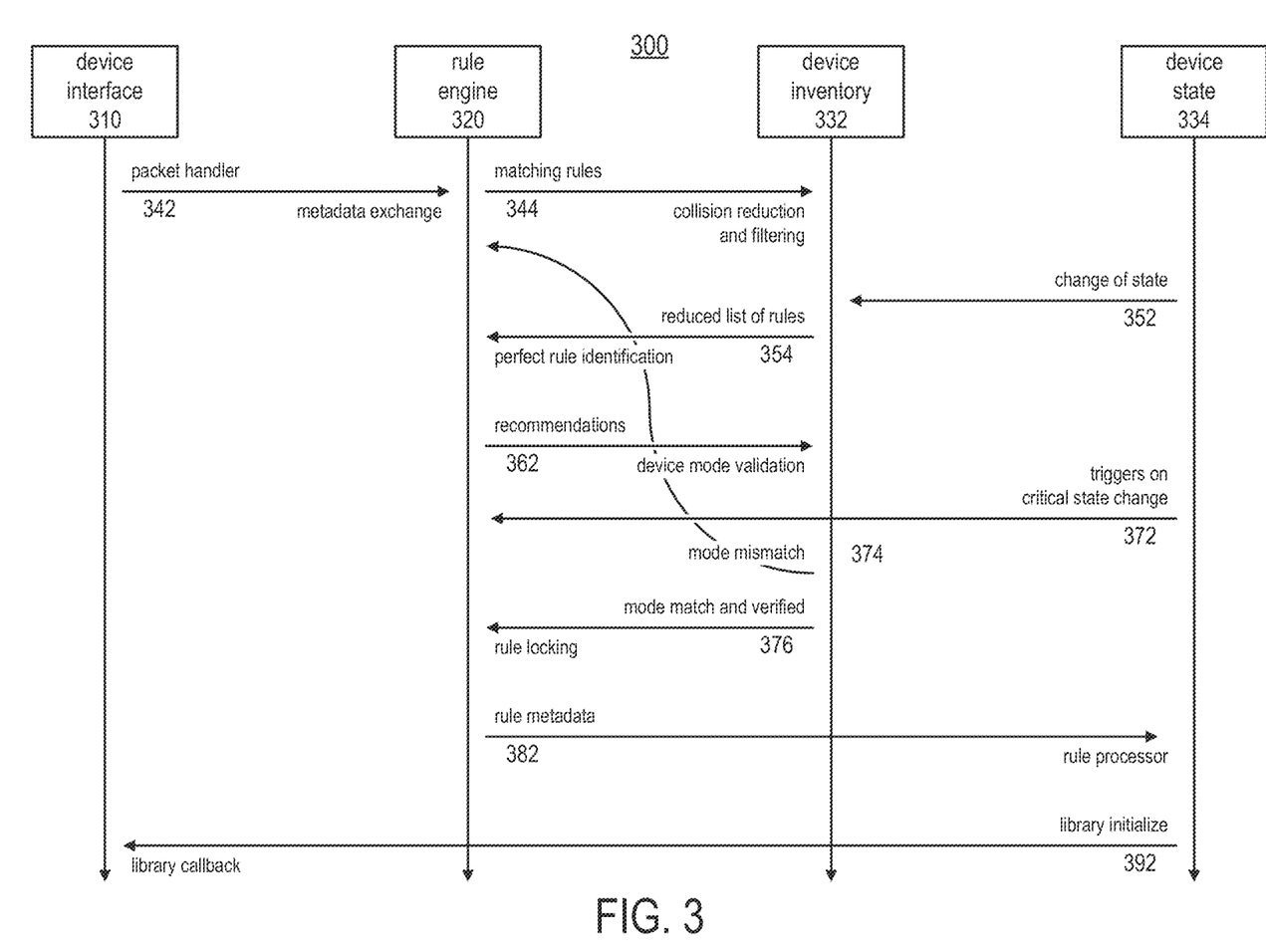
FIG. 3 shows a protocol diagram for a device participating in a scenario of Bluetooth® based contact-tracing, in accordance with one or more embodiments of the present disclosure.
Figure 4:
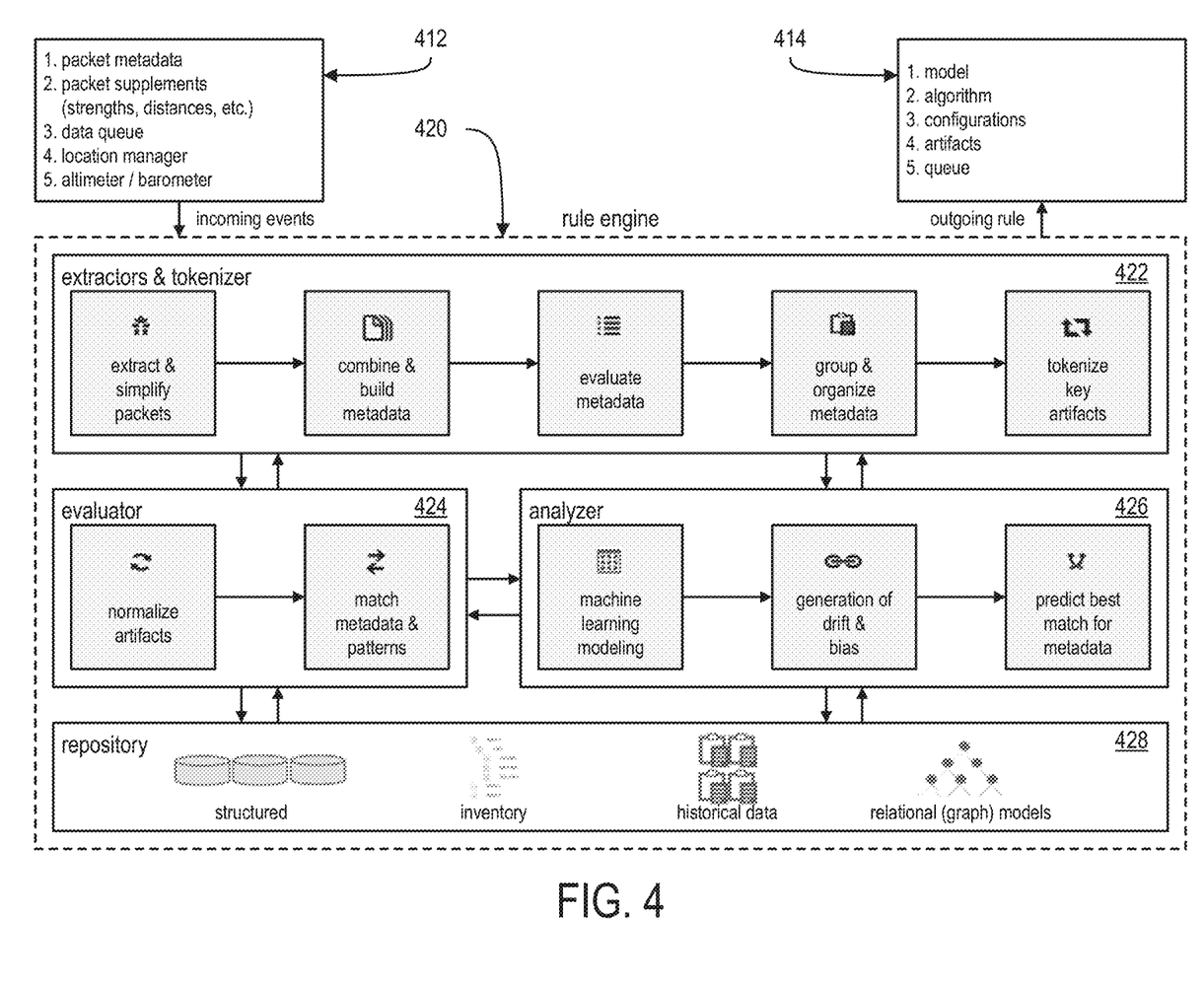
FIG. 4 shows a block diagram of a rule engine for a device participating in a scenario of Bluetooth® based contact-tracing, in accordance with one or more embodiments of the present disclosure.

Disclosed herein are methods and systems for Bluetooth® based contact-tracing. FIG. 1 shows a scenario of Bluetooth® based contact-tracing tools (e.g., methods and systems) as disclosed herein. FIGS. 2-4 show additional details for devices employing such Bluetooth® based contact-tracing tools.

FIG. 1 shows a scenario 100 of Bluetooth® based contact-tracing methods and systems. Scenario 100 and its various parts illustrate a tracking and tracing workflow related to user presence on an organization's premises which are enabled for monitoring by the methods and systems. In various embodiments, scenario 100 may be based upon any of a variety of wireless communication protocols for exchanging data between devices.

At a part 112, a user may install a contact-tracing application on a device, which may enable the device to participate in the contact-tracing methods and systems disclosed herein (rendering the device a "participating device"). The user may then register their approval to participate in the contact-tracing methods and systems (e.g., via the application).

Subsequently, at a part 114, the user (with their device) may enter the organization's premises, carrying their participating device. At a part 222, the app may start tracking and tracing the user (e.g., on the organization's premises), and at a part 224, the app may thereafter track movement of the user. Until the user leaves the organization's premises, the device (via the application) may track the user's movements on the organization's premises.

Each participating device (e.g., of participating users) may regularly and/or periodically execute advertising operations, such as Bluetooth® Low Energy (BLE) based advertising operations, to allow other participating devices to detect the close proximity of the participating device. Similarly, each participating device may regularly and/or periodically execute scanning operations, such as BLE based scanning operations, to detect other participating devices in close proximity to the participating device.

Each participating device may exchange secure beacon identifiers with other participating devices (e.g., other devices whose advertisements have been detected by scanning). One device's successful scanning of an advertisement of another participating device may correspond with an event in which the users carrying the devices have come in contact with and/or in close proximity to each other. For example, at a part 232, the user may come in contact with and/or in close proximity to a second user.

At a part 134, data pertaining to a user's movements, and/or data relating to a user's contact and/or proximity events, may be sent to a secure, remote system (e.g., a cloud-based server or other computer system). Later, at a part 152, the second user may be identified as being diagnosed with a health condition being tracked and traced (e.g., COVID-19 positivity), and at a part 154, the remote system may determine events in which the user came in contact with and/or in close proximity to other users, such as during a relevant window of time. At a part 156, the remote system may then take relevant actions, such as notifying any such users (and/or representatives within the organization) of the contact and/or close proximity.

Accordingly, in scenario 100, Bluetooth® and GPS (Global Positioning Satellite) technology may be employed by an organization to promote contact tracing with maximum security and minimal information. A user may install an application for the contact-tracing methods and systems on a relevant device, in order to enable the device to participate in the methods and systems (e.g., at part 112). The application may then use Bluetooth® and GPS features to keep track of the user's position and/or movement on the organization's premises (e.g., at part 124). (Mobile applications may be made available for Android® and/or iOS® mobile operating systems. Watch applications may be made available on, e.g., the Tizen Store for Samsung Smart Watches. BLE Beacons may work with Radius Network® devices.) With Bluetooth® and GPS enabled, position and/or movement of the user may be recorded and/or reported, along with whether the user has been in contact with and/or in close proximity to another user. This information may subsequently be used to determine which users may have been in contact with and/or in close proximity to another user who may have been diagnosed with a health condition being tracked and traced (e.g., COVID-19).

Accordingly, in exemplary embodiments, an organization (e.g., a business, company, firm, educational institution, or other enterprise) may register their use of the methods and systems (e.g., with a central provider) and may configure various settings. All users associated with the organization (e.g., employees) may install the associated application on one or more devices. The users may then sign in to affirm that the methods and systems may begin to track the devices (e.g., at part 112).

In various embodiments, at the time of sign-in, a user identifier (e.g., a unique alphanumeric string) may be generated that may be used indefinitely (e.g., for the entirety of the lifetime of the contact-tracing tools). This may advantageously keep users well-informed of their exposure risks, and may advantageously help to curb further spread of tracked and traced health conditions (e.g., COVID-19 positivity). In some embodiments, the contact-tracing tools might not reveal or store actual user information; instead, they may make use of this dynamically-generated user identifier.

The application on each participating device may begin recording and tracking the corresponding user's movement (e.g., at part 122) as soon as the user enter the organization's premises (e.g., an office or other facility) (e.g., at part 114). When a user's device comes in contact with and/or in close proximity to devices of other users, the installed applications may exchange secure beacon identifiers with each other through (e.g., through BLE links), and may record and track the contact and/or close proximity event (e.g., at part 132).

User movement and contact/proximity event data may periodically be sent to a remote system (e.g., the cloud) (e.g., at part 134).

The application may alert a participating user (perhaps conditioned upon subscription to alerts and/or notifications) if they have come in contact with and/or in close proximity to another user diagnosed with a tracked and traced health condition (e.g., COVID-19 positivity), such as within a relevant predetermined time-window (e.g., at part 156). The application may also inform a user whether they have ever met another user who has been identified as having a tracked and traced health condition (e.g., COVID-19 positivity).

Once a user leaves an organization's premises (e.g., at part 144), the application may stop tracking their movement and/or contact/proximity events (e.g., at part 142). In various embodiments, entrance onto an organization's premises and/or departing from the organization's premises may be registered by contact with any of a variety of Bluetooth® devices near entrances and/or exits.

In exemplary embodiments users may have access to centralized contact tracing (e.g., when on the premises of an organization) that may help them determine if they have been exposed to other users who have been identified as having a tracked and traced health condition (e.g., COVID-19 positivity). For example, contact/proximity data of an identified user may be accessed to trace other users who came in contact with and/or in close proximity to the identified user. Alternatively, the movement data of an identified user may be accessed to trace other users whose movement was in contact with and/or in close proximity to the movement of the identified user (e.g., instances of movement intersecting with movement of the identified user, such as at a predetermined threshold distance and/or for a predetermined threshold time, for example). Users may accordingly be well-informed, and in a timely manner, in order to take advisable and prudent actions to curb further spread.

Contact tracing methods and systems as disclosed herein may capture information relevant to understanding the movement a user on an organization's premises merely to conclude whether any risk is foreseen to other users (e.g., within identified areas of the premises). On a per-user basis, the application may accordingly capture and report information related to: movement of the user across the premises (e.g., via latitude and longitude); other users who may have come in contact with and/or in close proximity to the user (e.g., within a specified or predetermined distance, or as determined by virtue of a successful advertisement/scanning based Bluetooth® handshake); and, if applicable, a duration for which the user may come in contact with and/or been in close proximity to other users.

In some embodiments, the contact-tracing tools may advantageously implement location tracking for contact tracing (e.g., by continuously tracking the movement of a user from the time the organization's premises have been entered until the time the organization's premises have been left). For some embodiments, the contact-tracing tools may advantageously prevent overcrowding and/or geofencing issues (e.g., by employing a geofence-based tracking system to ensure that movements and events are tracked or monitored merely in designated areas). In some embodiments, the contact-tracing tools may advantageously be secure and transparent (e.g., by ensuring that a user's identity will not be compromised, such as by the use of user identifiers and/or by providing explicit consent for the application to track movement). In various embodiments, the contact-tracing tools may advantageously reduce battery consumption and/or reduce the rate of missed user-contact events.

For some embodiments, the contact-tracing tools may advantageously employ rule-based alerts and notifications for critical and warning states (e.g., by tracking up to three levels of interaction between users). In various embodiments, the contact-tracing tools may advantageously feature customized reporting at various levels (e.g., an organization level, a location level, and/or a user level), and may employ options for self-declaration.

In comparison with other technologies, the contact-tracing tools herein may provide various improvements, such as: improvements to accuracy of contact event detection; monitoring and tracing, even in a background mode of a device's operating system (e.g., of iOS®), and even in a power-saving mode (e.g., of devices such as smart phones); capturing of three-dimensional data (latitude, longitude, and altitude) per event; improved battery usage in mobile devices and smart watches (where active mode may consume less than 15% of a battery's charge throughout the day); multi-level contact tracing (e.g., through an administrative portal, such as a web-based portal); and/or improved security and privacy.

The BLE-based contact-tracing tools disclosed herein may use context and environment to prioritize scanning mode and broadcast mode (e.g., through selection of Bluetooth® libraries). The tools may consider various aspects of a participating device, such as background and/or foreground operation, power mode, adapter activity, historical trends, and nearby devices and their broadcasting modes. The tools may toggle between multiple modes (e.g., through selection of Bluetooth® libraries), and may auto-adjust the scanning mode and the broadcasting mode in real time for better results. The tools may measure their accuracy through a smart engine (e.g., a machine-learning-based engine), and may switch between modes based on comparing that accuracy with a predetermined threshold. (In various embodiments, accuracy may be established by how often secure beacon identifiers are exchanged with other advertising devices that have having been successfully detected by scan.) The tools may also check for signal strength, in order to assist in optimizing broadcasting and scanning schedules, to further optimize battery performance.

The operation of the tools may result in dynamic adjustments to broadcasting mode and scanning mode (e.g., via Bluetooth® library selection), in real time, which may advantageously improve accuracy and battery life. For example, in some embodiments, the tools disclosed herein may have an accuracy (e.g., an accuracy in determining optimal and/or appropriate mode) of over 90% (e.g., for an iOS® device, in the background and in phone-locked mode).

FIG. 2 shows a block diagram of an architecture 200 for a device participating in a scenario of Bluetooth® based contact-tracing (such as scenario 100). Architecture 200 may include a variety of libraries 240 that may represent algorithms chosen for scanning and/or broadcasting operations. Libraries 240 may comprise a first library and/or kit 242 (e.g., corresponding with Altbeacon), a second library and/or kit 244 (e.g., corresponding with iBeacon), and so on, up to an Nth library and/or kit 248. In various embodiments, the libraries may not be limited to being Bluetooth® libraries, but may be libraries for any of a variety of wireless communication protocols.

Architecture 200 may also include a device specific rule engine 220, a device inventory 232, an event stack 234, a data stack 236, and/or a history 238. Inventory 232 may represent correct (e.g., real-time) status of the various hardware & software models of accessible components of the device. Event stack 234 may record a history of events occurring to the device (which may include exchanges of data, but also signal strength events, power-connectivity events, and so forth). Data stack 236 may include records of the exchange of data (such as during an event). History 238 may include information such as latitude, longitude, and altitude.

A device interface 210 may be used to interact with, e.g., rule engine 220 and/or libraries 240. Device interface 210 may comprise a scanning module 211 and/or an advertising module 214, which may correspond with and/or be exercised during the use of BLE scanning and/or BLE broadcasting as discussed herein.

FIG. 3 shows a diagram of a protocol 300 for a device participating in a scenario of Bluetooth® based contact-tracing (such as scenario 100). Protocol 300 may take place between a device interface 310, a rule engine 320, and a device inventory 332 (which may be substantially similar to device interface 210, rule engine 220, and device inventory 332, respectively), as well as a device state 334.

Device interface 310 may prompt rule engine 320 to propose a change of algorithm (e.g., on or more BLE libraries). For example, at a part 342, device interface 310 may use a packet handler and/or engage in a metadata exchange with rule engine 320.

A machine-learning-based model (e.g., of rule engine 320) may then use device inventory 332 and/or device state 334 to either accept the proposed algorithm or reject in, which may in turn prompt the rule engine to propose another algorithm, until the machine-learning-based model has accepted the proposed algorithm. For example, at a part 344, a part 352, a part 354, a part 362, and/or a part 374 rule engine 320 may engage in an iterative process of proposing new algorithms and determining whether they are rejected, until an acceptable algorithm has been proposed.

Once a proposed change of algorithm has been accepted, the device interface is informed of the change, and the new algorithm or algorithms (e.g., new libraries) may be used in subsequent BLE communication. For example, at a part 376, a part 382, and/or a part 392, the acceptable algorithm may be identified and communicated to device interface 310, which may thereafter employ corresponding libraries (e.g., BLE libraries) and/or make other changes (as discussed herein) that may be associated with the acceptable algorithm.

FIG. 4 shows a block diagram 400 of a rule engine for a device participating in a scenario of Bluetooth® based contact-tracing (such as scenario 100). Accuracy in establishing contact and/or proximity events may advantageously provide and/or enhance reliability of contact tracing. Accuracy may depend upon factors such as device battery capacity, Bluetooth adapter implementation and/or strength, and the nature of devices within BLE interaction range. Accuracy may diminish significantly when devices are in a power saving mode, or when different devices or models of devices are interacting with each other. The disclosed tools may advantageously optimize choices of algorithms (e.g., Bluetooth libraries) that may consider relevant factors (such as environmental and mode-related factors), and may learn over the course of time.

Devices incorporating the methods and systems disclosed herein may comprise a rule engine 420 (which may be substantially similar to rule engine 220 and/or rule engine 320) having an extractor portion 422 (e.g., an extractor and/or tokenizer portion), an evaluator portion 424, and/or an analyzer portion 426. Extractor portion 422 may be a front-facing portion that accepts data like packets (e.g., BLE packets) and tokenizes them into artifacts and metadata. Evaluator portion 424 may use historical data to match and select the most appropriate algorithm (e.g., Bluetooth libraries for broadcasting operations and/or scanning operations), based on various factors. This selection may then be sent to analyzer portion 426. Analyzer portion 426 may use a machine-learning model to approve or reject the selected algorithm. This interaction between evaluator portion 424 and analyzer portion 426 may continue until a best-fit algorithm (e.g., an algorithm acceptable to the machine-learning model) is selected.

Rule engine 420 may include a repository 428 facilitating the use of structured rules (e.g., patterns and state-based mappings), inventory information (e.g., device hardware and/or software state), historical data, and relational models for decision making. The binary storage and bit level communication may advantageously provide an efficient selector that processes packets within a few milliseconds to ensure a real-time analysis and accelerated performance.

Figure 5:
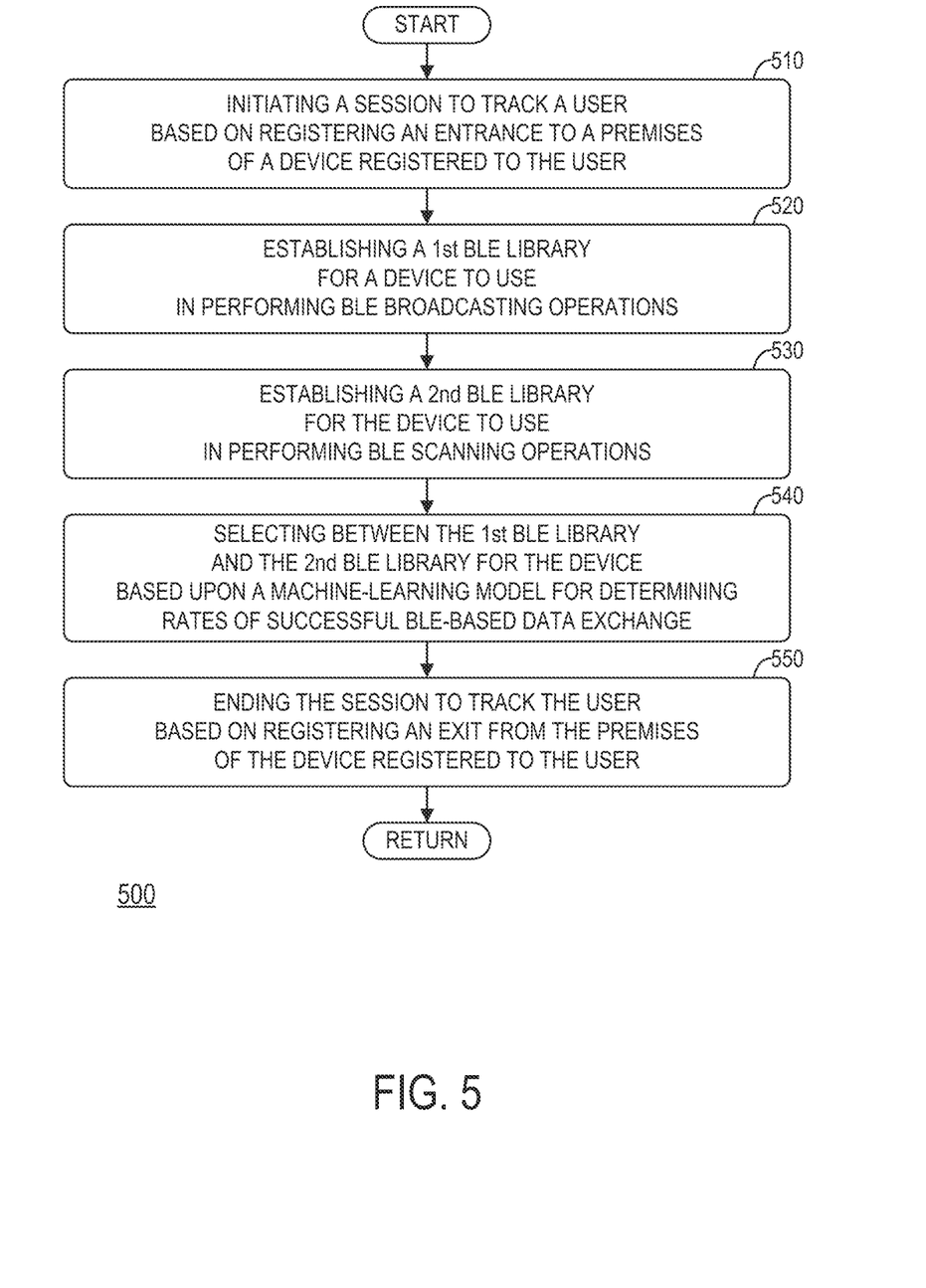
FIG. 5 shows a method of Bluetooth® Low Energy (BLE) library selection for contact tracing, in accordance with one or more embodiments of the present disclosure.

FIG. 5 shows a method 500 of BLE library selection for contact tracing. Method 500 comprises an establishing 520, an establishing 530, and a selecting 540. In various embodiments, method 500 may also comprise an initiating 510 and/or an ending 550. Method 500

In establishing 520, a first BLE library for a device to use in performing BLE broadcasting operations may be established. In establishing 530, a second BLE library for the device to use in performing BLE scanning operations may be established. In selecting 530, a selection between at least one of the first BLE library and the second BLE library for the device may be made, based upon a machine-learning model for determining rates of successful BLE-based data exchange.

In various embodiments, in initiating 510, a session to track a user based on registering an entrance to a premises of a device registered to the user may be initiated. For various embodiments, in ending 520, the session to track the user based on registering an exit from the premises of the device registered to the user may be ended.

In some embodiments, the selection may be dynamic and continuous. For some embodiments, the selection may select both the first BLE library and the second BLE library.

For some embodiments, the machine-learning model (which may be substantially similar to a machine-learning model of rule engine 420) may track rates of successful BLE-based data exchange based at least in part upon: whether device operation is in a background mode or a foreground mode; a power mode of the device; and/or an inventory for the device. In some embodiments, the machine-learning model may track rates of successful BLE-based data exchange based at least in part upon historical operational information for the device. For some embodiments, the machine-learning model may track rates of successful BLE-based data exchange based at least in part upon information regarding nearby devices and broadcasting modes. In some embodiments, the machine-learning model may track rates of successful BLE-based data exchange based at least in part upon: geographic information; type of the device; mode of the device; activity on the device; received BLE packets of nearby devices; and/or a signal strength. For some embodiments, the geographic information includes a latitude, a longitude, and an altitude.

In various embodiments, the device may be a smart phone, a smart watch, or a Bluetooth® beacon device.

Figure 6:
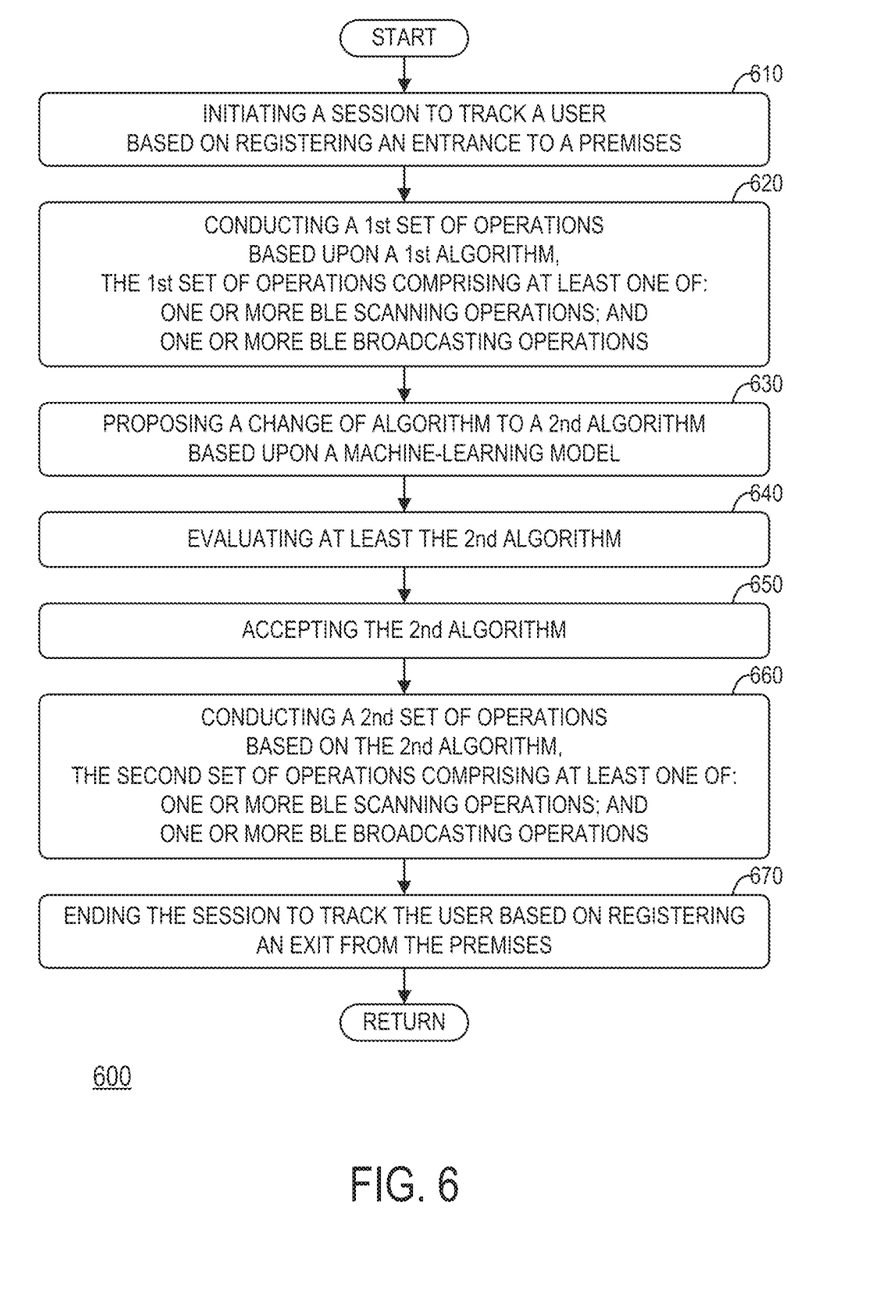
FIG. 6 shows a method of BLE algorithm selection for contact tracing, in accordance with one or more embodiments of the present disclosure.

FIG. 6 shows a method 600 of BLE algorithm selection for contact tracing. Method 600 comprises a conducting 620, a proposing 630, an evaluating 640, an accepting 650, and conducting 660. In various embodiments, method 600 may also comprise an initiating 610 and/or an initiating 670.

In conducting 620, a first set of operations may be conducted based upon a first algorithm. The first set of operations may comprise one or more BLE scanning operations and/or and one or more BLE broadcasting operations. In proposing 630, a change of algorithm to a second algorithm may be proposed, based upon a machine-learning model. In evaluating 640, at least the second algorithm may be evaluated, and in accepting 650, the second algorithm may be accepted. In conducting 660, a second set of operations may then be conducted based on the second algorithm. The second set of operations may comprise one or more BLE scanning operations and/or one or more BLE broadcasting operations.

In various embodiments, in initiating 610, a session to track a user based on registering an entrance to a premises may be initiated. For various embodiments, in ending 670, the session to track the user based on registering an exit from the premises may be ended.

In various embodiments, the machine-learning model may have been trained against a set of features including: whether device operation is in a background mode or a foreground mode; a power mode of the device; and/or an inventory for the device. For various embodiments, the machine-learning model may have been trained against a set of features including historical operational information for the device. In various embodiments, the machine-learning model may have been trained against a set of features including information regarding nearby devices and broadcasting modes. For various embodiments, the machine-learning model may have been trained against a set of features including a latitude, a longitude, and an altitude.

In various embodiments, the first algorithm may correspond with a first BLE library, and the second algorithm may correspond with a second BLE library. For some embodiments, the conducting of the first set of operations and the conducting of the second set of operations may be done using a smart phone, a smart watch, or a Bluetooth® beacon device.

The methods disclosed herein may be configured for the operation of the systems disclosed herein. For example, method 500 and/or method 600 may be employed in a scenario substantially similar to scenario 100, by a device having an architecture substantially similar to architecture 200, to undertake a protocol substantially similar to protocol 300, and/or using a rule engine substantially similar to rule engine 420. Thus, the same advantages that apply to the systems may apply to the methods.

Figure 7:
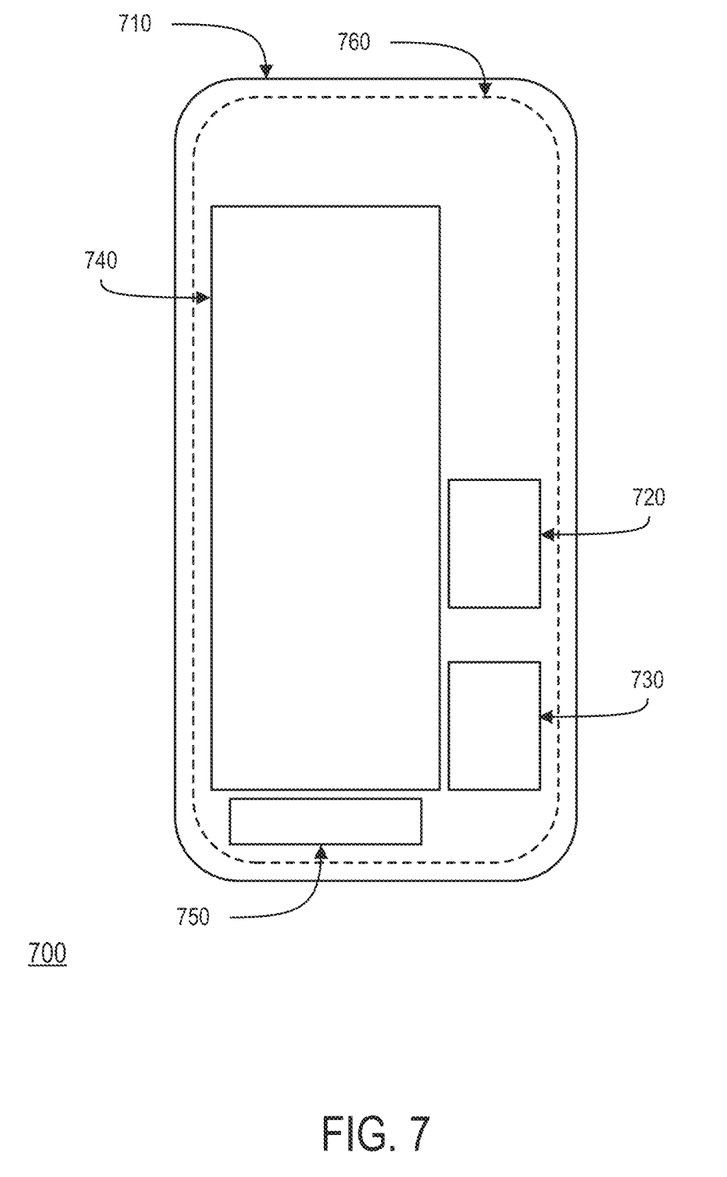
FIG. 7 shows a system for facilitating BLE based contact tracing, in accordance with one or more embodiments of the present disclosure.

FIG. 7 shows a system 700 for facilitating BLE based contact tracing. System 700 may comprise a case 710, one or more processors 720, one or more memories 730, one or more batteries 740, one or more antennas 750, and/or a display screen 760. Memories 730 may have executable instructions stored therein that, when executed, cause processors 720 to perform various operations, as disclosed herein.

System 700 (and/or other systems and devices disclosed herein) may be configured in accordance with the systems discussed herein. For example, system 700 may be employed in a scenario substantially similar to scenario 100, may include an architecture substantially similar to architecture 200, may undertake a protocol substantially similar to protocol 300, and/or may use a rule engine substantially similar to rule engine 420. Thus, the same advantages that apply to the systems discussed herein may apply to system 700.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, and so on. The described methods and associated actions may also be performed in various orders in addition to the order described in this application, in parallel, and/or simultaneously.

The description of embodiments has been presented for purposes of illustration and description. Suitable modifications and variations to the embodiments may be performed in light of the above description or may be acquired from practicing the methods. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

The disclosure provides support for a method comprising: establishing a first BLE library for a device to use in performing BLE broadcasting operations, establishing a second BLE library for the device to use in performing BLE scanning operations, and selecting between at least one of the first BLE library and the second BLE library for the device based upon a machine-learning model for determining rates of successful BLE-based data exchange. In a first example of the method, the selection is dynamic and continuous. In a second example of the method, optionally including the first example, the selection selects both the first BLE library and the second BLE library. In a third example of the method, optionally including one or both of the first and second examples, the machine-learning model tracks rates of successful BLE-based data exchange based at least in part upon one or more of: whether device operation is in a background mode or a foreground mode, a power mode of the device, and an inventory for the device. In a fourth example of the method, optionally including one or more or each of the first through third examples, the machine-learning model tracks rates of successful BLE-based data exchange based at least in part upon historical operational information for the device. In a fifth example of the method, optionally including one or more or each of the first through fourth examples, the machine-learning model tracks rates of successful BLE-based data exchange based at least in part upon information regarding nearby devices and broadcasting modes. In a sixth example of the method, optionally including one or more or each of the first through fifth examples, the machine-learning model tracks rates of successful BLE-based data exchange based at least in part upon: geographic information, type of the device, mode of the device, activity on the device, received BLE packets of nearby devices, and a signal strength. In a seventh example of the method, optionally including one or more or each of the first through sixth examples, the geographic information includes a latitude, a longitude, and an altitude. In an eighth example of the method, optionally including one or more or each of the first through seventh examples, the device is selected from a group consisting of: a smart phone, a smart watch, and a Bluetooth® beacon device.

The disclosure also provides support for a method of contact tracing participation via a device, the method comprising: conducting a first set of operations based upon a first algorithm, the first set of operations comprising at least one of: one or more BLE scanning operations, and one or more BLE broadcasting operations, proposing a change of algorithm to a second algorithm based upon a machine-learning model, evaluating at least the second algorithm, accepting the second algorithm, and conducting a second set of operations based on the second algorithm, the second set of operations comprising at least one of: one or more BLE scanning operations, and one or more BLE broadcasting operations. In a first example of the method, the method further comprises: initiating a session to track a user based on registering an entrance to a premises, and ending the session to track the user based on registering an exit from the premises. In a second example of the method, optionally including the first example, the machine-learning model has been trained against a set of features including: whether device operation is in a background mode or a foreground mode, a power mode of the device, and an inventory for the device. In a third example of the method, optionally including one or both of the first and second examples, the machine-learning model has been trained against a set of features including historical operational information for the device. In a fourth example of the method, optionally including one or more or each of the first through third examples, the machine-learning model has been trained against a set of features including information regarding nearby devices and broadcasting modes. In a fifth example of the method, optionally including one or more or each of the first through fourth examples, the machine-learning model has been trained against a set of features including a latitude, a longitude, and an altitude. In a sixth example of the method, optionally including one or more or each of the first through fifth examples, the conducting of the first set of operations and the second set of operations is done using a device selected from a group consisting of: a smart phone, a smart watch, and a Bluetooth® beacon device. In a seventh example of the method, optionally including one or more or each of the first through sixth examples, the first algorithm corresponds with a first BLE library, and the second algorithm corresponds with a second BLE library.

The disclosure also provides support for a system for participating in organizational contact tracing, comprising: one or more processors, and a non-transitory memory having executable instructions stored therein that, when executed, cause the one or more processors to: initiate a session to track a user based on registering an entrance to a premises of a device registered to the user, establish, during the session to track the user, a first BLE library for a device to use in performing BLE broadcasting operations, establish, during the session to track the user, a second BLE library for the device to use in performing BLE scanning operations, select, during the session to track the user, between at least one of the first BLE library and the second BLE library for the device based upon a machine-learning model for determining rates of successful BLE-based data exchange, and end the session to track the user based on registering an exit from the premises of the device registered to the user. In a first example of the system, the machine-learning model has been trained against a set of features including one or more of: whether device operation is in a background mode or a foreground mode, a power mode of the device, and an inventory for the device, historical operational information for the device, information regarding nearby devices and broadcasting modes, and geographic information, and wherein the selection is dynamic and continuous. In a second example of the system, optionally including the first example, the device is selected from a group consisting of: a smart phone, a smart watch, and a Bluetooth® beacon device.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. Terms such as "first," "second," "third," and so on are used merely as labels, and are not intended to impose numerical requirements or a particular positional order on their objects. The following claims particularly point out subject matter from the above disclosure that is regarded as novel and non-obvious.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    establishing a first wireless communication library for a device to use in performing wireless-communication broadcasting operations;
    establishing a second wireless communication library for the device to use in performing wireless-communication scanning operations;
    tracking, via a machine-learning model, rates of successful wireless-communication-based data exchange; and
    selecting between the first wireless communication library and the second wireless communication library for the device based upon the machine-learning model determined rates of successful wireless-communication-based data exchange.

2. The method of claim 1, wherein the selection is dynamic and continuous.

3. The method of claim 1, wherein the first wireless communication library is a first Bluetooth® Low Energy (BLE) library; and wherein the second wireless communication library is a second BLE library.

4. The method of claim 1, wherein the machine-learning model tracks rates of successful wireless-communication-based data exchange based at least in part upon one or more of: whether device operation is in a background mode or a foreground mode; a power mode of the device; and an inventory for the device.

5. The method of claim 1, wherein the machine-learning model tracks rates of successful wireless-communication-based data exchange based at least in part upon historical operational information for the device.

6. The method of claim 1, wherein the machine-learning model tracks rates of successful wireless-communication-based data exchange based at least in part upon information regarding nearby devices and broadcasting modes.

7. The method of claim 1, wherein the machine-learning model tracks rates of successful wireless-communication-based data exchange based at least in part upon: geographic information; type of the device; mode of the device; activity on the device; received wireless communication packets of nearby devices; and a signal strength.

8. The method of claim 7, wherein the geographic information includes a latitude, a longitude, and an altitude.

9. The method of claim 1, wherein the device is selected from a group consisting of: a smart phone; a smart watch; and a Bluetooth® beacon device.

10. A method of contact tracing participation via a device, the method comprising:
    conducting a first set of operations based upon a first algorithm, the first set of operations comprising at least one of: one or more Bluetooth® Low Energy (BLE) scanning operations; and one or more BLE broadcasting operations;
    proposing a change of algorithm to a second algorithm based upon a machine-learning model;
    evaluating at least the second algorithm;
    accepting the second algorithm; and
    conducting a second set of operations based on the second algorithm, the second set of operations comprising at least one of: one or more BLE scanning operations; and one or more BLE broadcasting operations, wherein the first algorithm corresponds with a first BLE library, and the second algorithm corresponds with a second BLE library.

11. The method of claim 10, further comprising:
    initiating a session to track a user based on registering an entrance to a premises; and
    ending the session to track the user based on registering an exit from the premises.

12. The method of contact tracing participation via a device of claim 10, wherein the machine-learning model has been trained against a set of features including: whether device operation is in a background mode or a foreground mode; a power mode of the device; and an inventory for the device.

13. The method of contact tracing participation via a device of claim 10, wherein the machine-learning model has been trained against a set of features including historical operational information for the device.

14. The method of contact tracing participation via a device of claim 10, wherein the machine-learning model has been trained against a set of features including information regarding nearby devices and broadcasting modes.

15. The method of contact tracing participation via a device of claim 10, wherein the machine-learning model has been trained against a set of features including a latitude, a longitude, and an altitude.

16. The method of contact tracing participation via a device of claim 10, wherein the conducting of the first set of operations and the second set of operations is done using a device selected from a group consisting of: a smart phone; a smart watch; and a Bluetooth® beacon device.

17. A system for participating in organizational contact tracing, comprising:
    one or more processors; and
    a non-transitory memory having executable instructions stored therein that, when executed, cause the one or more processors to:
        initiate a session to track a user based on registering an entrance to a premises of a device registered to the user;
        establish, during the session to track the user, a first Bluetooth® Low Energy (BLE) library for a device to use in performing BLE broadcasting operations;
        establish, during the session to track the user, a second BLE library for the device to use in performing BLE scanning operations;
        select, during the session to track the user, between of the first BLE library and the second BLE library for the device based upon a machine-learning model for determining rates of successful BLE-based data exchange in order to take into consideration device modes, activities, and communication environments to decide upon libraries for BLE broadcasting and BLE scanning; and
        end the session to track the user based on registering an exit from the premises of the device registered to the user.

18. The system for participating in organizational contact tracing of claim 17,
    wherein the machine-learning model has been trained against a set of features including one or more of: whether device operation is in a background mode or a foreground mode; a power mode of the device; an inventory for the device; historical operational information for the device; information regarding nearby devices and broadcasting modes; and geographic information; and
    wherein the selection is dynamic and continuous.

19. The system for participating in organizational contact tracing of claim 18, wherein the device is selected from a group consisting of: a smart phone; a smart watch; and a Bluetooth® beacon device.

* * * * *

UNITED STATES PATENT AND TRADEMARK OFFICE
CERTIFICATE OF CORRECTION

| | | |
|---|---|---|
| PATENT NO. | : 12,096,247 B2 | Page 1 of 1 |
| APPLICATION NO. | : 17/644030 | |
| DATED | : September 17, 2024 | |
| INVENTOR(S) | : Nitish Shrivastava | |

It is certified that error appears in the above-identified patent and that said Letters Patent is hereby corrected as shown below:

In the Claims

In Claim 17, Column 14, Line 31, remove "of" between the words "between" and "the"

Signed and Sealed this
Tenth Day of December, 2024

*Katherine Kelly Vidal*

Katherine Kelly Vidal
*Director of the United States Patent and Trademark Office*